(12) United States Patent
Neumann et al.

(10) Patent No.: US 11,174,561 B2
(45) Date of Patent: Nov. 16, 2021

(54) ELECTROCHEMICAL MONO-HYDROXYLATION OF ORGANIC COMPOUNDS

(71) Applicant: YEDA RESEARCH AND DEVELOPMENT CO. LTD., Rehovot (IL)

(72) Inventors: Ronny Neumann, Kfar Saba (IL); Alexander Khenkin, Rehovot (IL); Miriam Somekh, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 0 days.

(21) Appl. No.: 16/771,243

(22) PCT Filed: Dec. 10, 2018

(86) PCT No.: PCT/IL2018/051344
§ 371 (c)(1),
(2) Date: Jun. 10, 2020

(87) PCT Pub. No.: WO2019/111264
PCT Pub. Date: Jun. 13, 2019

(65) Prior Publication Data
US 2021/0172077 A1     Jun. 10, 2021

(30) Foreign Application Priority Data
Dec. 10, 2017  (IL) .......................................... 256228

(51) Int. Cl.
*C25B 3/23* (2021.01)
*C25B 3/07* (2021.01)
*B01J 23/78* (2006.01)
*C25B 1/02* (2006.01)

(52) U.S. Cl.
CPC ................. *C25B 3/23* (2021.01); *B01J 23/78* (2013.01); *C25B 1/02* (2013.01); *C25B 3/07* (2021.01)

(58) Field of Classification Search
None
See application file for complete search history.

(56) References Cited

U.S. PATENT DOCUMENTS

| 3,248,312 A | 4/1966 | Young |
| 3,448,021 A | 6/1969 | Koehl, Jr. |
| 4,193,850 A | 3/1980 | Hengartner et al. |
| 2011/0263889 A1* | 10/2011 | Bowden ................. C07C 67/08 560/124 |

OTHER PUBLICATIONS

Acharyya et al. (2015)—Synergistic effect between ultrasmall Cu (II) oxide and CuCr2O4 spinel nanoparticles in selective hydroxylation of benzene to phenol with air as oxidant—ACS Catalysis, 5(5):2850-8.

(Continued)

*Primary Examiner* — Wojciech Haske
(74) *Attorney, Agent, or Firm* — Mark S. Cohen; Pearl Cohen Zedek Latzer Baratz LLP

(57) ABSTRACT

The invention relates to electrocatalytic processes for the formation of formate esters using at least one catalyst or pre-catalyst; wherein the formate ester can be further hydrolyzed.

23 Claims, 1 Drawing Sheet

(56) References Cited

OTHER PUBLICATIONS

Al Mesfer et al. (2016)—Catalytic conversion of benzene to phenol—Russian Journal of Applied Chemistry, 89(11):1869-78.
Baker et al. (1956)—Heteropoly salts containing cobalt and hexavalent tungsten in the anion1—Journal of the American Chemical Society, 78(18):4503-10.
Begum, S. (2011)—Alkyl formate esters hydrolysis in aqueous medium. A comparative study of acid-catalyzed hydrolysis—Journal of The Chemical Society of Pakistan, 23(4), 139-143.
Beller, M. et al, (2017)—Chemistry future: priorities and opportunities from the sustainability perspective—ChemSusChem, 10(1), 6-13.
Carloni et al. (1991)—Strong Medium and Counterion Effects upon the Redox Potential of the 12-Tungstocobaltate (III/II) Couple' Acta chemica scandinavica, 45:373-6.
Eberson L. (1983)—Electron-transfer reactions in organic chemistry. 4. A mechanistic study of the oxidation of p-methoxytoluene by 12-tungstocobalt (III) ate ion—Journal of the American Chemical Society, 105(10):3192-9.
Ene et al. (2011)—Competitive adsorption and interaction of benzene and oxygen on Cu/HZSM5 zeolites—The Journal of Physical Chemistry C., 115(9):3688-94.
Glass, E. N. et al. (2016)—Transition metal substitution effects on metal-to-polyoxometalate charge transfer—Inorganic chemistry, 55(9), 4308-4319.
Hirose et al. (2016)—Catalytic Hydroxylation of Benzene to Phenol by Dioxygen with an NADH Analogue—Chemistry—A European Journal, 22(36):12904-9.
Hoelderich W.F. (2000)—Environmentally benign manufacturing of fine and intermediate chemicals—Catalysis today, 62(1):115-30.
Horn et al. (2016)—Synthetic organic electrochemistry: An enabling and innately sustainable method—ACS central science, 2(5):302-8.
International Search Report for PCT/IL2018/051344 dated Feb. 14, 2020.
Joo et al. (2013)—Importance of acid-base equilibrium in electrocatalytic oxidation of formic acid on platinum—Journal of the American Chemical Society, 135(27):9991-4.
Kawamata et al. (2017)—Scalable, electrochemical oxidation of unactivated C—H bonds—Journal of the American Chemical Society, 139(22):7448-51.
Khenkin et al. (2001)—Electron and Oxygen Transfer in Polyoxometalate, H5PV2Mo10O40, Catalyzed Oxidation of Aromatic and Alkyl Aromatic Compounds: Evidence for Aerobic Mars-van Krevelen-Type Reactions in the Liquid Homogeneous Phase—Journal of the American Chemical Society, 123(35):8531-42.
Kojima et al. (2011)—Formation of a ruthenium (iv)-oxo complex by electron-transfer oxidation of a coordinatively saturated ruthenium (II) complex and detection of oxygen-rebound intermediates in C—H bond oxygenation—Journal of the American Chemical Society, 133(30):11692-700.
Larsen, A. S. et al. (2002)—Hydrocarbon oxidation by bis-µ-oxo manganese dimers: electron transfer, hydride transfer, and hydrogen atom transfer mechanisms—Journal of the American Chemical Society, 124(34), 10112-10123.
Lee et al. (2012)—Electrochemical oxidation of benzene to phenol—Angewandte Chemie International Edition, 51(2):440-4.
Morofuji et al. (2012)—Metal- and Chemical-Oxidant-Free CH/CH Cross-Coupling of Aromatic Compounds: The Use of Radical-Cation Pools—Angewandte Chemie, 51(29):7259-62.
Rauk et al. (1994)—Carboxyl Free Radicals: Formyloxyl (HCOO. bul.) and Acetyloxyl (CH3COO. bul.) Revisited—Journal of the American Chemical Society, 116(18):8222-8.
Ricci et al. (2009)—Towards the direct oxidation of benzene to phenol—Sustainable Industrial Chemistry, 20:507-28.
Sarma et al. (2016)—Electron transfer oxidation of benzene and aerobic oxidation to phenol—ACS Catalysis, 6(10):6403-7.
Singh et al. (2016)—Hydrogen energy future with formic acid: a renewable chemical hydrogen storage system—Catalysis Science & Technology, 6(1):12-40.
Tsuji, T.et al. (2017)—Specific enhancement of catalytic activity by a dicopper core: selective hydroxylation of benzene to phenol with hydrogen peroxide—Angewandte Chemie International Edition, 56(27), 7779-7782.
Vannucci, A. K. et al. (2012)—Nonaqueous electrocatalytic oxidation of the alkylaromatic ethylbenzene by a surface bound RuV (O) catalyst—ACS Catalysis, 2(5), 716-719.
Xin et al. (2009)—A hierarchical Fe/ZSM-5 zeolite with superior catalytic performance for benzene hydroxylation to phenol—Chemical communications, (48):7590-2.
Yamada et al. (2016)—One-step selective hydroxylation of benzene to phenol with hydrogen peroxide catalysed by copper complexes incorporated into mesoporous silica-alumina—Chemical science, 7(4):2856-63.
Yamanaka et al. (2003)—Direct and Continuous Production of Hydrogen Peroxide with 93% Selectivity Using a Fuel-Cell System Angewandte Chemie International Edition, 42(31):3653-5.
Yang et al. (2017)—Palladium-Catalyzed C(sp3)-H Oxygenation via Electrochemical Oxidation—Journal of the American Chemical Society, 17;139(8):3293-8.

* cited by examiner

ELECTROCHEMICAL MONO-HYDROXYLATION OF ORGANIC COMPOUNDS

FIELD OF THE INVENTION

The invention relates to electrocatalytic processes for the formation of formate esters using at least one catalyst or pre-catalyst; wherein the formate ester can be further hydrolyzed.

BACKGROUND OF THE INVENTION

The sustainable hydroxylation of hydrocarbons such as benzene, alkanes, alkenes and their derivatives remain a significant research goal. Typically, hydroxylation may occur either by oxygen transfer via metal-oxo complexes, which are very rarely obtained using molecular oxygen or by hydroxy radicals, often formed from hydrogen peroxide. Mostly, thermochemical hydroxylation approaches have been studied in recent generations, but now with the increasing viability of utilizing solar energy as a source of electricity, electrochemical approaches will be of greater importance (M. Beller, G. Centi, L. Sun, *ChemSusChem*, 2017, 10, 6-13). Electrochemical approaches of oxidation of simple hydrocarbons are rare (Y. Kawamata, M. Yan, Z. Liu, D. H. Bao, J. Chen, J. T. Starr, P. S. Baran, *J. Am. Chem. Soc.* 2017, 139, 7448-7451; Q. L. Yang, Y. Q. Li, C. Ma, P. Fang, X. J. Zhang, T. S. Mei, *J. Am. Chem. Soc.* 2017, 139, 3293-3298; A. K. Vannucci, Z. Chen, J. J. Concepcion, T. J. Meyer, *ACS Catal.* 2012, 2, 716-719), but the gas phase $V_2O_5$ anodic oxidation of benzene where hydroxy radicals are formed from water vapor has been reported (B. Lee, H. Naito, T. Hibino, *Angew. Chem. Int. Ed* 2012, 51, 440-444), however, benzene and water are immiscible, which complicates the reaction.

Therefore, there is still a need for a selective hydroxylation of organic compounds, such as benzene, an aromatic hydrocarbon, to phenol, or methane, ethane and cyclohexane, aliphatic hydrocarbons, to methanol, ethanol and cyclohexanol respectively, by a sustainable method, which do not have the drawbacks of high temperature thermochemical approaches.

Eberson reported that a polyoxometalate anion, $[Co(III)W_{12}O_{40}]^{5-}$, which has a Keggin structure with a coordinatively and sterically inaccessible Co(II) heteroatom, can be considered a "soluble anode", that is a one-electron outer sphere oxidant (L. Eberson *J. Am. Chem. Soc.* 1983, 105, 3192-3199). This anion is active only for the oxidation at the benzylic position of reactive, i.e. alkylarenes with electron donating groups, which have relatively low oxidation potentials, such as 4-methoxy toluene. Hydrocarbons with stronger carbon-hydrogen bonds or higher oxidation potentials such as benzene, methane, ethane or cyclohexane are not oxidized by $[Co(I)W_{12}O_{40}]$. It is also possible to introduce a first row transition metal into $[Co(II)W_{12}O_{40}]$ by replacing one W=O moiety to yield for example, $[Co(III)Mn(II)(H_2O)W_{11}O_{39}]^{6-}$ (E. N Glass, J. Fielden, Z. Huang, X. Xiang, D. G. Musaev, T. Lian, C. L. Hill, *Inorg. Chem.* 2016, 55, 4308-4319.

SUMMARY OF THE INVENTION

The inventors of the present application reveal a process where formic acid, used as solvent and/or reagent, was reacted via an electrocatalytic transformation with a hydrocarbon, such as benzene, alkane, alkene, or their corresponding halogenated derivatives, to selectively yield formate esters that are easily and readily hydrolyzed by water to yield the corresponding alcohol products.

Thus, the process of the invention is directed to the formation of a formate ester:

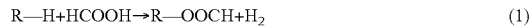

$$R-H + HCOOH \rightarrow R-OOCH + H_2 \qquad (1)$$

wherein the process is an electrocatalytic reaction performed in the presence of at least one catalyst or at least one pre-catalyst (an agent that is transformed during the process to a catalyst), a formate salt electrolyte and wherein R is selected from a group consisting of linear or branched, optionally substituted, aryl, alkyl, alkenyl, alkynyl groups.

In some embodiments, the formate ester prepared by the process described above is further hydrolyzed:

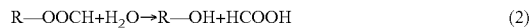

$$R-OOCH + H_2O \rightarrow R-OH + HCOOH \qquad (2)$$

In some embodiments, said further step of hydrolysis is carried out in the presence of an acid catalyst.

In some other embodiments, said at least one catalyst has an oxidation potential of at least above 1.5 V. In other embodiments, said at least one catalyst has an oxidation potential of between about 1.5 V to 1.8 V.

In some embodiments, said at least one pre-catalyst is $Q_n[Co(III)TM(L)W_{11}O_{39}]$, $Q_5[Co(III)W_{12}O_{40}]$ or any combination thereof; wherein Q is an alkali metal cation, an ammonium cation, and/or $H^+$; TM is a transition metal such as V(IV), V(V), Cr(III), Mn(II), Mn(III), Mn(IV), Fe(II), Fe(III), Co(II), Co(III), Ni(II), Cu(I), Cu(II), Cu(III), Zn(II), (Ru(II), Ru(III), Rh(III), Pd(II) and Pt(II); L is aqua, hydroxy, oxo, formate, acetate, acetonitrile, dimethylsulfoxide, halide, nitrate, sulfate, hydrogensulfate, phosphate, hydrogenphosphate, dihydrogenphospate, cyano, thiocyano, nitroso and nitrite; and n is an integer between 2 and 8.

In some embodiments, the at least one catalyst is formed via oxidation of the pre-catalyst, wherein said pre-catalyst is described hereinabove. In some embodiments, the pre-catalyst is active in catalyzing the process of the invention, the catalyst is active or both the pre-catalyst and catalyst are active. In other embodiments, non-limiting examples of pre-catalyst/catalyst transition metal couples in the catalysts within the process of the invention consist of: Co(III)/Co(IV), Mn(II)/Mn(III), Mn(III)/Mn(IV), Fe(II)/Fe(III), Cu(II)/Cu(III) and V(IV)/V(V). Each possibility represents a separate embodiment of the invention.

In some other embodiments, said at least one catalyst is $Q_4[Co(IV)W_{12}O_{40}]$, $Q_n[Co(IV)TM(L)W_{11}O_{39}]$ or any combination thereof; wherein Q is an alkali metal cation, an ammonium cation, and/or $H^+$; TM is a transition metal such as V(IV), V(V), Cr(III), Mn(II), Mn(III), Mn(IV), Fe(II), Fe(III), Co(II), Co(III), Ni(II), Cu(I), Cu(II), Cu(III), Zn(II), Ru(II), Ru(III), Rh(III), Pd(II) and Pt(II); L is aqua, hydroxy, oxo, formate, acetate, acetonitrile, dimethylsulfoxide, halide, nitrate, sulfate, hydrogensulfate, phosphate, hydrogenphosphate, dihydrogenphospate, cyano, thiocyano, nitroso and nitrite; and n is an integer between 2 and 8.

In yet other embodiments, said formate salt electrolyte is HCOOQ' where Q' is an alkali metal or $NH_4^+$. In other embodiments, said formate salt electrolyte is HCOOLi.

In some embodiments, said formic acid is the single solvent in said process. In other embodiments, said process of the invention is carried out in the presence of a mixture of formic acid and water as solvent mixture. In another embodiment, said process of the invention is carried out in the presence of a mixture of formic acid and any other solvent. In another embodiment, non-limiting examples for the other solvent consist of: water, acetonitrile, acetic acid, acetone, methanol, ethanol, 2-propanol, propionitrile, butyronitrile, isobutyronitrile, 1-propanol and any combination thereof.

In some embodiments, R is an aryl or heteroaryl (i.e. an aromatic group having between 6 to 18 atoms. In other embodiments, R is an aryl group, optionally substituted with at least one halogen. Said substitution can be at any carbon on the aryl ring.

In some embodiments, R is a linear or branched alkyl group (i.e. a hydrocarbon group having between 1 to 20 carbon atoms, connected to each other via single sigma bonds only). In other embodiments, R is a linear or branched alkyl group substituted with at least one group selected from a halogen, —COOH, —C(=O)R' and OH; wherein R' is H or a linear or branched alkyl. Said substitution can be at any carbon on the alkyl chain.

In some embodiments, R is a linear or branched alkenyl group (i.e. a hydrocarbon group having between 2 to 20 carbon atoms, having at least one double bond connecting two carbon atoms). In other embodiments, R is a linear or branched alkenyl group substituted with at least one group selected from a halogen, —COOH, —C(=O)R' and OH; wherein R' is H or a straight or branched alkyl. Said substitution can be at any carbon on the alkenyl chain.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
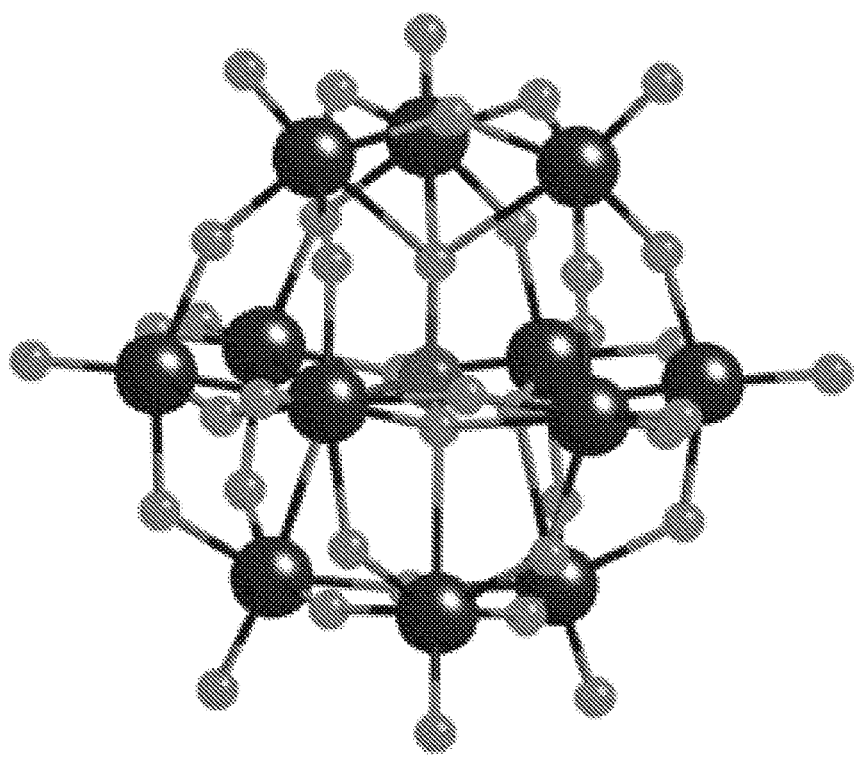
FIG. 1 is an example of a catalyst suitable for this process, where Co is dark gray (center), O is light gray and W is black.

It will be appreciated that for simplicity and clarity of illustration, elements shown in FIG. 1 have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, the inventors of the present invention have found that a strong oxidant, such as $[Co(IV)W_{12}O_{40}]^{4-}$, FIG. 1, with a redox potential of 1.8 V in acetonitrile, can be formed electrochemically from $[Co(II)W_{12}O_{40}]^{5-}$. Importantly, $[Co(III)W_{12}O_{40}]^{5-}/[Co(IV)W_{12}O_{40}]^{4-}$, in the presence of formic acid as a solvent or co-solvent catalyze the electrocatalytic reaction of formic acid with a hydrocarbon to yield a corresponding formate ester as product. The reaction is especially effective using a formate salt such as lithium formate as an electrolyte in an anodic electrochemical transformation.

Thus, for example, benzene was not oxidized by $[Co(IV)W_{12}O_{40}]^{4-}$ directly in acetonitrile alone. However, in formic acid as solvent (or mixed with other solvents as described hereinabove) with lithium formate as electrolyte, benzene reacted by oxidation of the carbon-hydrogen bond leading to the formation of phenylformate likely through the in situ formation of an oxygen centered formyloxyl radical, $HC(O)O^{\bullet}$, at the anode and corresponding formation of molecular hydrogen ($H_2$) at the cathode. The reaction is catalyzed by $[Co(IV)W_{12}O_{40}]^{4-}$. Phenylformate is then easily hydrolyzed to yield phenol and formic acid, the last can be recovered.

The transformation, therefore, represents an indirect hydroxylation of benzene with $H_2O$ to yield phenol with $H_2$ as co-product:

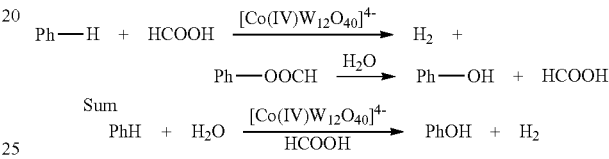

In the past, it has been reported (A. K. Singh, S. Singh, A. Kumar, *Catal. Sci. Tech.* 2016, 6, 12-40) that formic acid has been decomposed in an electrochemical reaction to yield carbon dioxide ($CO_2$) at the cathode. Contrarily, according to the present invention, in the presence of a hydrocarbon substrate, and a suitable and sufficiently oxidizing catalyst, $CO_2$ formation is minimized, leading to formation of formate esters via carbon-hydrogen bond activation. A recent research suggests the initial adsorption of a formate anion on an electrode that is maximized by addition of formate to formic acid. Therefore, in the presence of a substrate, demonstrated below for benzene and preferably in the presence of $[Co(II)W_{12}O_{40}]^{5-}/[Co(IV)W_{12}O_{40}]^{4-}$ redox couple, one can suggest the following reaction pathway:

Anode:

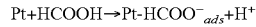

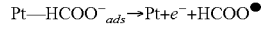

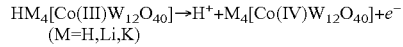
(M=H,Li,K)

Catalysis:

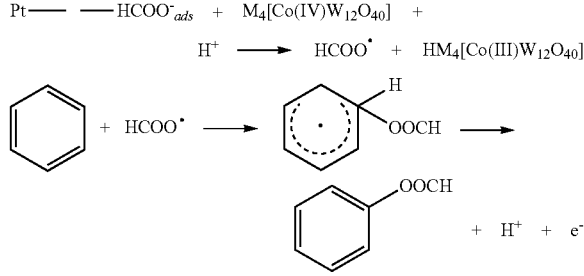

Cathode:

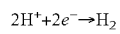

Figure 2:
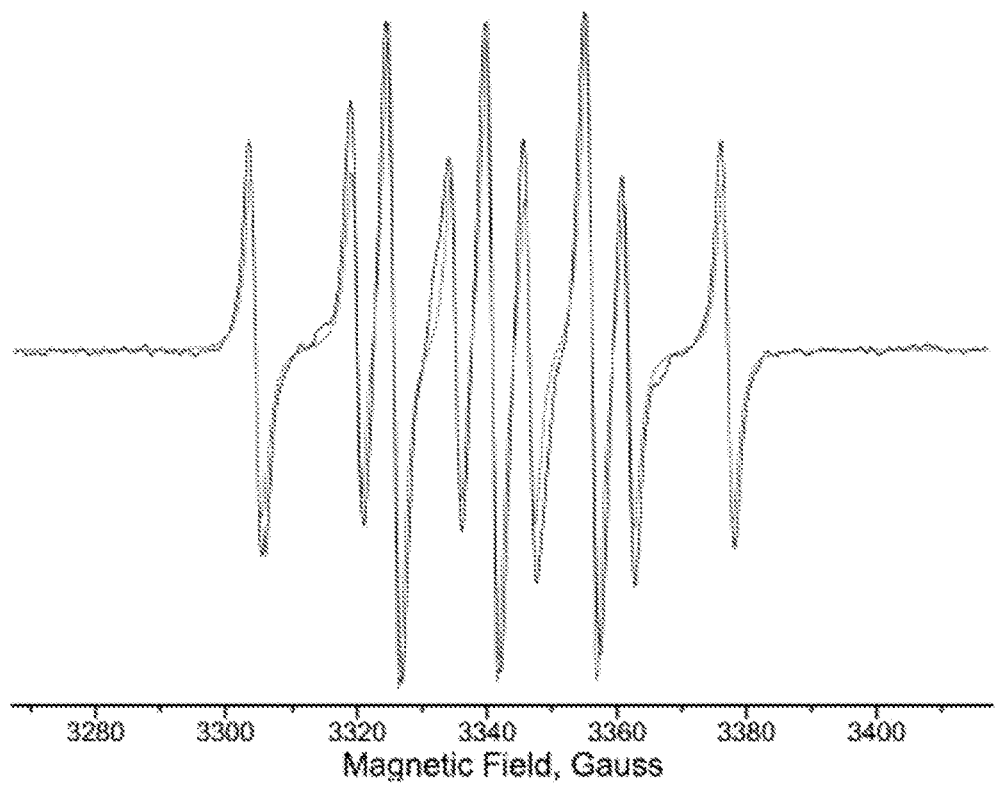
FIG. 2 is an EPR spectrum of the spin adduct of BMPO and the formyloxy radical. Experimental spectrum is black and simulated spectrum is light gray.

After the first step of formate adsorption, a one-electron oxidation yields an oxygen centered formyloxyl radical, HC(O)O•. This reaction is catalyzed by $[Co(IV)W_{12}O_{40}]^{4-}$ but also occurs to some degree in its absence. The formyloxyl radical, HC(O)O• was identified by EPR (FIG. 2) using BMPO (5-tert-butoxycarbonyl-5-methyl-1-pyrroline-N-oxide) as a spin trap. From the simulation, hyperfine splitting constants of A=15.5 G and A=22 G associated with $^{14}$N and $^{1}$H atoms (see below N and H in light gray in the spin adduct) were obtained. One observes two magnetically equivalent hydrogen atoms due to the presence of two diastereomers in the spin adduct product:

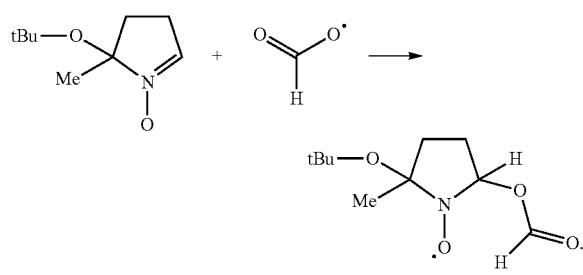

Although the formyloxyl radical normally (in the absence of an organic substrate) decomposes to $CO_2$, it has a sufficient lifetime in the presence of benzene to react to form a cyclohexadienyl formate radical intermediate species followed by formation of phenylformate. The radical nature of this reaction is supported by the kinetic isotope effect (KIE) observed for the oxidation of benzene and the product distribution observed in the oxidation of halo-benzenes.

Pre-Catalyst

In some embodiments, the process of this invention makes use of a pre-catalyst. The pre-catalysts used in the process of this invention include: $Q_n[Co(III)TM(L)W_{11}O_{39}]$, $Q_5[Co(III)W_{12}O_{40}]$; wherein Q is an alkali metal cation, an ammonium cation, and/or H$^+$; TM is a transition metal such as V(IV), V(V), Cr(III), Mn(II), Mn(III), Mn(IV), Fe(II), Fe(III), Co(II), Co(III), Ni(II), Cu(I), Cu(II), Cu(III), Zn(II), Ru(II), Ru(III), Rh(III), Pd(II) and Pt(II); L is aqua, hydroxy, oxo, formate, acetate, acetonitrile, dimethylsulfoxide, halide, nitrate, sulfate, hydrogensulfate, phosphate, hydrogenphosphate, dihydrogenphospate, cyano, thiocyano, nitroso and nitrite; and n is an integer between 2 and 8.

In another embodiment, the pre-catalyst is $Q_7[Co(III)Mn(II)(H_2O)W_{11}O_{39}]$, $Q_6[Co(III)Mn(III)(H_2O)W_{11}O_{39}]$, $Q_7[Co(III)Cu(II)(H_2O)W_{11}O_{39}]$ or any combination thereof; wherein Q is an alkali metal cation, an ammonium cation, and/or H$^+$.

In another embodiment, the pre-catalyst is $K_7[Co(III)Mn(II)(H_2O)W_{11}O_{39}]$, $K_6[Co(III)Mn(III)(H_2O)W_{11}O_{39}]$, $K_6[Co(III)Fe(III)(H_2O)W_{11}O_{39}]$, $K_6[Co(III)Cr(III)(H_2O)W_{11}O_{39}]$, $K_7[Co(III)Zn(II)(H_2O)W_{11}O_{39}]$, $K_7[Co(III)Cu(II)(H_2O)W_{11}O_{39}]$ or any combination thereof. Each possibility represents a separate embodiment of the invention.

Catalyst

In some embodiments, the process of this invention makes use of a catalyst. In one embodiment, the catalyst is formed via oxidation of the pre-catalysts as described hereinabove. In another embodiment, the catalyst is $Q_4[Co(IV)W_{12}O_4]$ or $Q_n[Co(IV)TM(L)W_{11}O_{39}]$; wherein Q is an alkali metal cation, an ammonium cation, and/or H$^+$; TM is a transition metal such as V(IV), V(V), Cr(III), Mn(II), Mn(III), Mn(IV), Fe(II), Fe(III), Co(II), Co(III), Ni(I), Cu(I), Cu(II), Cu(III), Zn(II), Ru(II), Ru(III), Rh(III), Pd(II) and Pt(II); L is aqua, hydroxy, oxo, formate, acetate, acetonitrile, dimethylsulfoxide, halide, nitrate, sulfate, hydrogensulfate, phosphate, hydrogenphosphate, dihydrogenphospate, cyano, thiocyano, nitroso and nitrite; and n is an integer between 2 and 8.

In another embodiment, the catalyst is $Q_5[Co(IV)Mn(III)(H_2O)W_{11}O_{39}]$, $Q_5[Co(IV)Mn(IV)(OH)W_{11}O_{39}]$ or any combination thereof; wherein Q is as described hereinabove.

In another embodiment, the catalyst is $K_6[Co(IV)Mn(II)(H_2O)W_{11}O_{39}]$, $K_5[Co(IV)Mn(III)(H_2O)W_{11}O_{39}]$, $K_5[Co(IV)Fe(III)(H_2O)W_{11}O_{39}]$, $K_5[Co(IV)Cr(III)(H_2O)W_{11}O_{39}]$, $K_6[Co(IV)Zn(II)(H_2O)W_{11}O_{39}]$, $K_6[Co(IV)Cu(II)(H_2O)W_{11}O_{39}]$ or any combination thereof. Each possibility represents a separate embodiment of the invention.

In other embodiments, said at least one catalyst is cobalt formate, manganese formate or a combination thereof. In other embodiments, said at least one catalyst is cobalt tungstate, manganese tungstate or a combination thereof. In further embodiments, said at least one catalyst is any combination of cobalt formate, manganese formate, cobalt tungstate, manganese tungstate, $Q_4[Co(IV)W_{12}O_4]$ and $Q_n[Co(IV)TM(L)W_{11}O_{39}]$, wherein Q, TM and L are as described above.

In one embodiment, without being bound by any mechanism or theory, it is contemplated that all of the pre-catalysts and catalysts as described hereinabove and used within the process of the invention—act in a similar mechanism as detailed above for $[Co(III)W_{12}O_{40}]^{5-}/[Co(IV)W_{12}O_{40}]^{4-})$, with the in situ formation of the formyloxyl radical, HC(O)O•, during the process of the invention.

In some embodiments, the formate ester prepared by the process of this invention is further hydrolyzed to obtain the corresponding alcohol and formic acid. In other embodiments, the formate ester prepared by the process of this invention is reacted with an alcohol in a transesterification reaction to obtain the corresponding alcohol and formate ester.

While certain features of the invention are illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

EXAMPLES

Materials: All chemicals were reagent grade and used as supplied. Formic acid was 98-100% from Merck that by analysis was ~95% formic acid with ~5% water. The $K_5Co^{III}W_{12}O_{40}\cdot 16H_2O$ polyoxometalate was prepared by a known literature method [Baker, L. C. W.; McCutcheon, T. P. J. Am. Chem. Soc. 1956, 78, 4503-4506]. $H_5Co^{III}W_{12}O_{40}$ was prepared by passing a $K_5Co^{III}W_{12}O_{40}$ solution in water through acidic ion-exchange resin Amberlyst-15, and removal of water by vacuum evaporation.

Analytical Methods: Combined GC with a flame ionization detector and GC with a mass selective detector measurements were carried out to quantify and identify the products of the hydrocarbon reactions. The gaseous reaction products, $CO_2$ and $H_2$, were analyzed by GC with a thermal conductivity detector using a 15 m Carbonplot capillary column (0.53 mm ID).

Electrochemistry: The electrocatalytic experiments were performed in a thermostated microcell at 25° C. with platinum gauze anode working electrode (3 cm² effective area), a platinum wire cathode counter electrode with an Ag/AgCl reference electrode. In a typical reaction, a magnetically stirred solution of substrate and $K_5Co^{III}W_{12}O_4$ (10 μmol) in 3 mL formic acid was electrolyzed at constant potential (1.8 V vs Ag/AgCl) until a known amount of charge was passed. To the reaction was added water and the reaction mixture was extracted with ethyl ether, and the collected organic extracts were washed with aqueous $NaHCO_3$, then with water and finally dried with anhydrous $Na_2SO_4$. The conversion of substrate and yield of formate ester products were determined according to the analytical methods described above.

Examples of the oxidation of arenes, that is benzene and halogenated derivatives are presented in Table 1.

TABLE 1

Electrochemical Oxidation of Benzene and Halogenated Benzenes.[a]

| Substrate | Product (R=OCH)[b] | FE[f] | Yield mol % |
|---|---|---|---|
| PhH | PhOR | 58 | 14 |
| PhH [c] | PhOR | 26 | 9 |
| PhH [d] | PhOR | 75 | 35 |
| PhH[c,d] | PhOR | 7 | 7 |
| PhH[e] | PhOR | 2 | 17 |
| PhF | F—PhOR (o:m:p - 17:6:77) | 40 | 10 |
| PhCl | Cl—PhOR (o:m:p - 28:4:68) | 78 | 13 |
| PhBr | Br—PhOR (o:m:p - 25:5:70) | 95 | 25 |
| PhI | I—PhOR (o:m:p - 30:4:66) | 16 | 8 |
| 1,2-Cl₂Ph | 3,4-Cl₂PhOR (75) 2,3-Cl₂PhOR (25) | 25 | 28 |
| 1,2-Cl₂Ph[c] | 3,4-Cl₂PhOR (75) 2,3-Cl₂PhOR (25) | 4 | 8 |
| 1,2-Cl₂Ph[d] | 3,4-Cl₂PhOR (72) 2,3-Cl₂PhOR (28) | 76 | 37 |
| 1,3-Cl₂Ph | 2,4-Cl₂PhOR (88) 2,6-Cl₂PhOR (12) | 28 | 38 |

[a]Reaction conditions: 10 μmol $K_5Co(III)W_{12}O_{40}$, 1 mmol substrate, 0.5 mmol LiOOCH, in 3 mL HCOOH. Potential 1.8 V versus Ag/AgCl. Anode - Pt gauze, Cathode - Pt wire in a single cell configuration; t - 3 h. 25° C.
[b]Typically the formate ester was the only product, the exception being the reaction of PhBr and PhI where ~40% of the ester was hydrolyzed to the phenol derivative. It is possible that a small amount of HX is formed during the reaction leading to catalysis of the hydrolysis reaction.
[c] No $K_5Co(III)W_{12}O_{40}$
[d] 1.2 mmol LiOOCH.
[e]using a glassy carbon anode.
[f]FE-Faradaic efficiency for formation of ArOOCH.

ArOOCH were easily hydrolyzed to ArOH by addition of small amounts of acid. For example, the hydrolysis phenyl formate was carried out as follows: after its extraction, 1 mL of $H_2O$ and 10 μl of 60% $HClO_4$ were added and mixture was stirred 10 min. Analysis by GC methods showed the quantitative transformation to phenol.

Various points should be emphasized: (a) the reactions were selective to the formation of monoxidation products. (b) The ratio of ortho:meta:para isomers formed in the reactions of halobenzenes are indicative of a radical reaction, which was (c) also supported by a KIE in the competitive oxidation of 1:1 benzene: benzene-d₆ where KIE; $k_H/k_D=1.07$ was measured. (d) There was some reaction in the absence of $K_5Co(III)W_{12}O_{40}$, but its presence increased the efficiency both in terms of yield and Faradaic efficiency for the formation of aryl formates. (e) Further significant improvement in the reaction efficiency was observed by the addition of additional amounts of the lithium formate electrolyte, leading to Faradaic efficiencies of up to 75% and yields of aryl formates of 35 mol % at ~100% selectivity. (f) The reaction in the presence of air or under $N_2$ yielded the same result within experimental error. Thus, $O_2$ does not participate in the reaction (h) the current was quite stable with only some loss over time.

In addition, as shown in Table 2, a complete analysis of the reaction products including the formation of $CO_2$ and $H_2$ shows (i) that the reaction of benzene for 45 min showed a Faradaic efficiency for all products of >97% and yielded 39 μmol PhOOCH, 47 μmol $CO_2$ and 88 μmol $H_2$. Thus, the additional reaction in this oxidation of arenes was the decomposition of formic acid to $CO_2$ and $H_2$. (j) Under the same reaction conditions in the absence of benzene, equimolar amounts of $H_2$ and $CO_2$ (79±5 μmol) were formed. (k) $K_5Co(III)W_{12}O_{40}$ catalyzed the oxidation of formic acid since in its absence only 18±2 μmol $H_2$ and $CO_2$ each were found. (l) Finally, the use of lithium acetate as electrolyte in the presence of formic acid as solvent yielded significantly less products.

TABLE 2

Formation of $H_2$ and $CO_2$ during Electrolysis of Formic Acid

| Conditions | $H_2$ μmol | $CO_2$ μmol | PhOR μmol |
|---|---|---|---|
| All components | 88 ± 3 | 47 ± 3 | 39 ± 3 |
| No PhH | 82 ± 3 | 76 ± 3 | |
| No $Co(III)W_{12}O_{40}$/ No PhH | 18 ± 2 | 18 ± 2 | |
| LiOAc electrolyte | 34 ± 2 | 20 ± 2 | 11 ± 2 |

[a] Reaction conditions: 10 μmol $K_5Co(III)W_{12}O_{40}$, 1 mmol substrate, 0.5 mmol LiOOCH, in 3 mL HCOOH. Potential 1.8 V versus Ag/AgCl. Anode - Pt gauze, Cathode - Pt wire in a single cell configuration; t - 45 min. 25° C.

Examples of reactions with $Q_n$⁻Co(I)TM'(H₂O)W₁₁O₃₉, (wherein n' is 6 or 7 and TM' is Mn(III), Mn(II), Fe(III), Cr(III), Zn(II) or Cu(II)) are presented in Table 3. In a typical reaction, a magnetically stirred solution of benzene (1M) and $K_n$⁻Co(III)TM'(H₂O)W₁₁O₃₉ (2.5 mM) in 4 mL of 1:1 formic acid—acetonitrile and lithium formate (0.25M) was electrolyzed at constant potential (1.8 V vs Pt) by using a BioLogic Science VSP-201 potentiostat until a known amount of charge was passed. The conversion/yield of products, and selectivity were determined by GC, GC-MS. The faradaic efficiency for formation of organic products was calculated by dividing the amount of product (taking into account a two-electron oxidation) by the amount of electrons that were passed through the electrochemical cell. These examples demonstrate the feasibility of employing such compounds within the process of the invention.

TABLE 3

Reactions catalyzed by $K_n$·Co(III)TM'(L)W₁₁O₃₉.

| Catalyst | Products | Conversion, % | FE, % |
|---|---|---|---|
| $K_6Co(III)Mn(III)(H_2O)W_{11}O_{39}$ | Phenyl formate | 15 | 73 |
| $K_7Co(III)Mn(II)(H_2O)W_{11}O_{39}$ | Phenyl formate | 12 | 68 |
| $K_6Co(III)Fe(III)(H_2O)W_{11}O_{39}$ | Phenyl formate | 12 | 71 |
| $K_6Co(III)Cr(III)(H_2O)W_{11}O_{39}$ | Phenyl formate | 1.3 | 23 |
| $K_7Co(III)Zn(II)(H_2O)W_{11}O_{39}$ | Phenyl formate | 4 | 39 |
| $K_7Co(III)Cu(II)(H_2O)W_{11}O_{39}$ | Phenyl formate | 16 | 74 |

What is claimed is:
1. A process comprising the following step of formate ester formation:

R—H+HCOOH→R—OOCH+H₂ wherein the process is an electrocatalytic reaction performed in the presence of at least one catalyst or at least one pre-catalyst, a formate salt electrolyte and wherein R is selected from a group consisting of linear or branched, optionally substituted, aryl, alkyl, alkenyl, alkynyl groups;

wherein said at least one catalyst is $Q_4[Co(IV)W_{12}O_{40}]$, $Q_n[Co(IV)TM(L)W_{11}O_{39}]$ or any combination thereof: wherein Q is an alkali metal cation, an ammonium cation or $H^+$; TM is a transition metal cation selected from the group consisting of: V(IV), V(V), Cr(III), Mn(II), Mn(III), Mn(IV), Fe(II), Fe(III), Co(II), Co(III), Ni(II), Cu(I), Cu(II), Cu(III), Zn(II), Ru(II), Ru(III), Rh(III), Pd(II) and Pt(II); L is aqua, hydroxy, oxo, formate, acetate, acetonitrile, dimethylsulfoxide, halide, nitrate, sulfate, hydrogensulfate, phosphate, hydrogenphosphate, dihydrogenphospate, cyano, thiocyano, nitroso and nitrite; and n is an integer between 2 and 8; and wherein said at least one pre-catalyst is $Q_5[Co(III)W_{12}O_{40}]$ or $Q_n[Co(III)TM(L)W_{11}O_{39}]$; wherein Q is an alkali metal cation, an ammonium cation or $H^+$; TM is a transition metal cation selected from the group consisting of: V(IV), V(V), Cr(III), Mn(II), Mn(III), Mn(IV), Fe(II), Fe(III), Co(II), Co(III), Ni(II), Cu(I), Cu(II), Cu(III), Zn(II), Ru(II), Ru(III), Rh(III), Pd(II) and Pt(II); L is aqua, hydroxy, oxo, formate, acetate, acetonitrile, dimethylsulfoxide, halide, nitrate, sulfate, hydrogensulfate, phosphate, hydrogenphosphate, dihydrogenphospate, cyano, thiocyano, nitroso and nitrite; and n is an integer between 2 and 8.

2. The process of claim 1, wherein the formate ester is further hydrolyzed to formic acid:

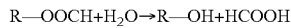
R—OOCH+$H_2$O→R—OH+HCOOH

3. The process according to claim 2, carried out in the presence of an acid catalyst.

4. The process according to claim 1, wherein said catalyst has an oxidation potential of at least above 1.5 V.

5. The process according to claim 1, wherein said catalyst has an oxidation potential of between about 1.5 V to 1.8 V.

6. The process according to claim 1, wherein said L is aqua or hydroxy.

7. The process according to claim 6, wherein said at least one pre-catalyst is $Q_7[Co(III)Mn(II)(H_2O)W_{11}O_{39}]$, $Q_6[Co(III)Mn(III)(H_2O)W_{11}O_{39}]$, $Q_7[Co(III)Cu(II)(H_2O)W_{11}O_{39}]$ or any combination thereof.

8. The process according to claim 1, wherein said at least one pre-catalyst is $K_7[Co(III)Mn(II)(H_2O)W_{11}O_{39}]$, $K_6[Co(III)Mn(III)(H_2O)W_{11}O_{39}]$, $K_6[Co(III)Fe(III)(H_2O)W_{11}O_{39}]$, $K_6[Co(III)Cr(III)(H_2O)W_{11}O_{39}]$, $K_7[Co(III)Zn(II)(H_2O)W_{11}O_{39}]$, $K_7[Co(III)Cu(II)(H_2O)W_{11}O_{39}]$ or any combination thereof.

9. The process according to claim 1, wherein said at least one catalyst is provided via oxidation of said pre-catalyst.

10. The process according to claim 1, wherein said at least one catalyst is $Q_5[Co(IV)Mn(III)(H_2O)W_{11}O_{39}]$, $Q_5[Co(IV)Mn(IV)(OH)W_{11}O_{39}]$ or any combination thereof.

11. The process according to claim 1, wherein said at least one catalyst is $K_6[Co(IV)Mn(II)(H_2O)W_{11}O_{39}]$, $K_5[Co(IV)Mn(III)(H_2O)W_{11}O_{39}]$, $K_5[Co(IV)Fe(III)(H_2O)W_{11}O_{39}]$, $K_5[Co(IV)Cr(III)(H_2O)W_{11}O_{39}]$, $K_6[Co(IV)Zn(II)(H_2O)W_{11}O_{39}]$, $K_6[Co(IV)Cu(II)(H_2O)W_{11}O_{39}]$ or any combination thereof.

12. The process according to claim 1, wherein said at least one catalyst is $Q_4[Co(IV)W_{12}O_{40}]$.

13. The process according to claim 1, wherein said at least one pre-catalyst is $Q_5[Co(III)W_{12}O_{40}]$; wherein Q is an alkali metal cation, an ammonium cation or $H^+$.

14. The process according to claim 1, wherein said formate salt electrolyte is HCOOQ' where Q' is an alkali metal cation or an ammonium cation.

15. The process according to claim 1, wherein said formate salt electrolyte is HCOOLi.

16. The process according to claim 1, wherein said formic acid is the single solvent in said process.

17. The process according to claim 1, comprising a mixture of formic acid and water, acetonitrile, acetic acid, acetone, methanol, ethanol, 2-propanol, propionitrile, butyronitrile, isobutyronitrile, 1-propanol or any combination thereof as solvent mixture.

18. The process according to claim 1, wherein R is an aryl.

19. The process according to claim 1, wherein R is an aryl group, optionally substituted with at least one halogen.

20. The process according to claim 1, wherein R is a linear or branched alkyl group.

21. The process according to claim 1, wherein R is a linear or branched alkyl group substituted with at east one group selected from a halogen, —COOH, —C(=O)R' and OH; wherein R' is H or a straight or branched alkyl.

22. The process according to claim 1, wherein R is a linear or branched alkenyl group.

23. The process according to claim 1, wherein R is a linear or branched alkenyl group substituted with at least one group selected from a halogen, —COOH, —C(=O)R' and OH; wherein R' is H or a linear or branched alkyl.

* * * * *